United States Patent [19]

Zawada

[11] Patent Number: 5,782,970
[45] Date of Patent: Jul. 21, 1998

[54] LIGHTWEIGHT, WATERPROOF, INSULATING, CEMENTITIOUS COMPOSITION

[75] Inventor: Joseph M. Zawada, Ashland, Mont.

[73] Assignee: Composite Industries of America, Inc., Las Vegas, Nev.

[21] Appl. No.: 367,878

[22] Filed: Jan. 3, 1995

[51] Int. Cl.$^6$ ...................................... C04B 16/08
[52] U.S. Cl. .................. 106/681; 106/638; 106/639; 106/672; 106/674; 106/682; 428/304.4
[58] Field of Search ........................... 106/713, 718, 106/638, 639, 672, 674, 681, 682; 521/83; 524/2, 8, 447; 428/304.4

[56] References Cited

U.S. PATENT DOCUMENTS

| | | | |
|---|---|---|---|
| 889,569 | 6/1908 | Albrecht | 106/700 |
| 1,309,038 | 7/1919 | Light | 106/609 |
| 1,309,296 | 7/1919 | Marks | 106/76 |
| 1,463,123 | 7/1923 | McAllister | 106/76 |
| 1,484,370 | 2/1924 | Bartlett | 106/30 |
| 2,057,330 | 10/1936 | Eichert | 106/93 |
| 2,377,484 | 6/1945 | Elmendorf | 106/76 |
| 2,592,345 | 4/1952 | Schnell et al. | 106/93 |
| 2,899,325 | 3/1959 | Kranz et al. | 106/93 |
| 3,118,807 | 1/1964 | Holcomb | 524/447 |
| 3,219,467 | 11/1965 | Redican | 106/90 |
| 3,257,491 | 6/1966 | Smits | 524/447 |
| 3,264,123 | 8/1966 | Bourlin | 106/76 |
| 3,311,483 | 3/1967 | Garnier et al. | 65/119 |
| 3,403,205 | 9/1968 | Ottenholm | 264/109 |
| 3,438,853 | 4/1969 | Haines et al. | 162/164 |
| 3,502,490 | 3/1970 | Ware | 106/15 |
| 3,705,837 | 12/1972 | Breslaver | 161/168 |
| 3,719,512 | 3/1973 | Danielis | 106/106 |
| 3,753,749 | 8/1973 | Nutt | 106/93 |
| 3,758,319 | 9/1973 | Ergene | 106/88 |
| 3,759,044 | 9/1973 | Caron et al. | 61/35 |
| 3,854,985 | 12/1974 | Suzuki e al. | 117/110 |
| 3,869,295 | 3/1975 | Bowles et al. | 521/83 X |
| 3,873,351 | 3/1975 | Veda et al. | 117/123 |
| 3,901,991 | 8/1975 | Veda et al. | 428/446 |
| 3,902,911 | 9/1975 | Messenger | 106/76 |
| 3,948,830 | 4/1976 | Donnelly et al. | 106/78 |
| 3,954,695 | 5/1976 | Cleland | 524/447 |
| 3,983,081 | 9/1976 | Dieterich et al. | 260/2.5 |
| 4,040,851 | 8/1977 | Ziegler | 106/93 |
| 4,047,962 | 9/1977 | Copeland | 106/90 |
| 4,077,809 | 3/1978 | Plungin et al. | 521/83 X |
| 4,101,335 | 7/1978 | Barrable | 106/99 |
| 4,124,072 | 11/1978 | Redford | 166/270 |
| 4,131,638 | 12/1978 | Whitaker et al. | 264/333 |
| 4,132,555 | 1/1979 | Barrable | 106/90 |
| 4,159,361 | 6/1979 | Schupak | 106/99 X |
| 4,162,166 | 7/1979 | Walls-Muycelo | 106/40 |
| 4,225,359 | 9/1980 | Schneider | 106/669 |
| 4,234,344 | 11/1980 | Tinsley et al. | 106/88 |
| 4,249,949 | 2/1981 | Wooler et al. | 106/90 |
| 4,268,317 | 5/1981 | Rayl | 106/89 |
| 4,303,450 | 12/1981 | Hacker | 106/88 |
| 4,308,068 | 12/1981 | Copling | 106/96 |
| 4,308,070 | 12/1981 | Cavicchio | 106/93 |
| 4,318,744 | 3/1982 | Dodson | 106/90 |
| 4,318,995 | 3/1982 | Rhodes et al. | 501/1 |
| 4,363,878 | 12/1982 | Yamamoto | 501/36 |
| 4,373,955 | 2/1983 | Bouchard et al. | 106/88 |
| 4,373,957 | 2/1983 | Pederson | 106/93 |
| 4,402,751 | 9/1983 | Wilde | 106/93 |
| 4,406,703 | 9/1983 | Guthrie | 106/93 |
| 4,443,562 | 4/1984 | Mayer | 524/2 X |
| 4,497,662 | 2/1985 | Chisolm | 106/92 |
| 4,505,753 | 3/1985 | Scheetz et al. | 106/90 |
| 4,568,390 | 2/1986 | Gelbman | 106/97 |
| 4,624,711 | 11/1986 | Styron | 524/447 |
| 4,654,083 | 3/1987 | Vandeburg | 521/83 |
| 4,673,437 | 6/1987 | Gelbman | 106/97 |
| 4,746,365 | 5/1988 | Babcock et al. | 524/8 |
| 4,799,961 | 1/1989 | Friberg | 106/89 |
| 4,861,378 | 8/1989 | Watanabe | 106/314 |
| 4,964,978 | 10/1990 | Brown et al. | 106/811 |
| 4,981,521 | 1/1991 | Betacchi | 106/115 |
| 5,015,606 | 5/1991 | Lang et al. | 501/84 |
| 5,021,093 | 6/1991 | Beshay | 106/731 |
| 5,021,094 | 6/1991 | Brown et al. | 106/803 |
| 5,047,086 | 9/1991 | Hayakawa et al. | 106/731 |
| 5,061,319 | 10/1991 | Hodson | 106/731 |
| 5,067,981 | 11/1991 | Hooykaas | 106/790 |
| 5,110,839 | 5/1992 | Chao | 521/83 |
| 5,112,405 | 5/1992 | Sanchez | 106/608 |
| 5,116,420 | 5/1992 | Schneider et al. | 106/640 |
| 5,207,830 | 5/1993 | Cowan et al. | 106/672 |
| 5,236,500 | 8/1993 | Schneider et al. | 106/640 |

(List continued on next page.)

*Primary Examiner*—Judy M. Reddick
*Attorney, Agent, or Firm*—Sixbey, Friedman, Leedom & Ferguson; Daniel W. Sixbey

[57] ABSTRACT

A lightweight insulating concrete is produced from a cement mix containing sawdust, diatomite, bentonite, and lime. The addition of rock salt and the entrainment of air bubbles results in a concrete with a high compressive strength, high thermal resistance (R) values (up to 30 to 40 times that of standard concrete), and excellent acoustical properties. The new insulating concrete is one third the weight of standard concrete. The composition is fire retardant, insect proof, and is very easy to clean up. Methods for producing cementitious materials include a process for manufacturing strong, lightweight, waterproof building products such as wall panels and roof panels. The mixture can be easily pumped for walls and floors. A well-insulated, cost-effective floor that has a slight give to it is excellent for gymnasium floors. This material is used for residential, light commercial, and agricultural buildings. The composition has the unique property of being able to absorb contaminated or hazardous materials especially petroleum based contaminants. The compressed air bubbles allow the composition to mix totally with the contaminated liquids and absorb the contaminants within the mass of the composition. After a curing process, the mass hardens and contains the contaminants within a hard concrete mass. This is especially useful in cleaning up and controlling contaminants in underground storage tanks especially in abandoned or closed service stations. The filling of these tanks and cylinders eliminates the need of costly excavating and the problem of disposing of the contaminants. The applicant calls the material Z MIX.

10 Claims, No Drawings

U.S. PATENT DOCUMENTS

| | | | |
|---|---|---|---|
| 5,250,578 | 10/1993 | Cornwell | 521/83 |
| 5,256,005 | 10/1993 | Beck III | 405/240 |
| 5,259,705 | 11/1993 | Breaux et al. | 405/267 |
| 5,263,797 | 11/1993 | Lindstrom et al. | 106/718 |
| 5,266,538 | 11/1993 | Knudson et al. | 106/164 |
| 5,268,028 | 12/1993 | Fifield | 106/726 |
| 5,284,513 | 2/1994 | Cowan et al. | 106/790 |
| 5,290,356 | 3/1994 | Frankowski | 106/726 |
| 5,332,435 | 7/1994 | Wright et al. | 524/2 |
| 5,342,445 | 8/1994 | Kiyomoto et al. | 106/789 |
| 5,391,437 | 2/1995 | Miyasaka et al. | 428/425.5 |
| 5,424,124 | 6/1995 | Yoshikawa et al. | 428/361 |
| 5,472,499 | 12/1995 | Crocker | 106/672 |
| 5,569,426 | 10/1996 | LeBlanc | 264/122 |

LIGHTWEIGHT, WATERPROOF, INSULATING, CEMENTITIOUS COMPOSITION

BACKGROUND-FIELD OF INVENTION

This present invention relates to improvement to concrete products, specifically to a structural insulating lightweight concrete that is waterproof and which is broad in use for floors walls, structural panels, and, in slurry form is particularly useful in environmental cleanup.

BACKGROUND OF THE INVENTION

Conventional concrete is a mixture of cement, sand, aggregate, and water. The addition of materials to cement to lower the weight of the concrete, to increase insulating qualities, and to impart other desirable properties is well known in the art. Adding sawdust or other low-density materials to reduce the weight of the composition and to improve their insulating properties is illustrated in U.S. Pat. Nos. 889,569 to Albrecht (1908), 1,039,038, to Light (1919), 1,463,123 to McAllister (1922), 1,484,370 to Bartlett (1924), 2,057,330 to Eichert (1936), 2,592,345 to Schnell and Bosshard (1947), 2,899,325 to Kranz et al. (1952), 3,264,125 to Bourlin (1966), and 4,166,455 to Araujo and Tick (1977). In addition to sawdust, other organic low-density materials such as hemp, wood shavings, bark particles, sugar cane, cotton waste, and pulp-mill waste have been used.

Chlorides, silicates, nitrates, and sulfates have been added to Portland cement to increase the binding of the particles in the concrete. Various additives are shown in U.S. Pat. Nos. 1,309,296 to Marks (1919), 1,463,123 to McAllister (1922), 1,484,370 to Bartlett (1924), 2,057,330 to Eichert (1936), 2,592,345 to Schnell and Bosshard (1947), 3,264,123 to Corning and McNally (1962), 3,311,483 to Garnier et al. (1967), and 5,122,405 to Sanchez (1992).

It is often desirable to utilize cements and concretes which are lightweight, strong, durable and affordable. It is known that many of the techniques for making lightweight organic materials require the process of using hammer mills, presses, heat, extended curing time, bringing the slurry to boiling point, and slaking the material in vats for days. A U.S. Pat. No. 5,112,405 by Sanchez (1992), used ammonium sterate to produce gaseous bubbles by reacting to calcium chloride. His claim was that the bubbles produced a lighter, better-insulated board. What was needed was a less expensive and more efficient way of creating the air bubbles.

Lightweight cement designs usually have higher than normal water demands, resulting in slow setup times, and weak, highly porous cement. What was needed was a tighter pore system that would not allow the aggression of the elements to penetrate and would have high insulating qualities.

Another aspect of using lightweight cements other than for building purposes is well known. Lightweight cement is also used in the containment of liquid contaminants. In dealing with underground cylinders and tanks, what was needed was a material with the capacity to absorb the contaminants and further to encapsulate said contaminants to reduce the possibility of leaching of the contaminants. If the contaminants are not totally contained, there are possibilities that the dangerous liquids could leach into the surrounding water table and pollute drinking water and surrounding soil.

Mechanical and electrical vibrators are often required in the process of filling cylinders and tanks. Due to the unpredictable nature of many contaminants, mechanical and electrical vibrators prove to be dangerous. It is desirable to have a material that does not require the use of mechanical and electrical vibrators or other devices that could prompt an explosion. Materials that are easy to pour, easy to clean up and affordable to use are desirable and needed for these purposes.

Grouting compositions have been used for many years to minimize movement of water or other liquids in subsurface structures. High concentrations of bentonite in grout mixtures made the mixtures become too thick and hard to pump. What was needed was a mixture that would utilize the bentonite's high degree of impermeability and yet would be easy to use.

Other objects and features will be in part apparent and in part pointed out hereinafter. The invention accordingly comprises the products hereinafter described the scope of the invention being indicated by the subjoined claims.

ADVANTAGES OF THE INVENTION

Accordingly, besides the advantages of the mixture described in my above patent, several advantages of the present invention are:

(a) to provide a lightweight building material approximately one third the weight of concrete;

(b) to provide floors, walls, and roofs with a high insulation value;

(c) to provide a building material that is fire resistant;

(d) to provide a building material that resists insects;

(e) to provide a building material that is waterproof;

(f) to provide a building material that is workable with standard carpentry tools;

(g) to provide a cementitious building product that is easier for pumping;

(h) to provide a cementitious building product that is extremely easy to clean up;

(i) to provide a cementitious material that can be agitated with compressed air to help vibrate and homogenize masses for certain applications;

(j) to provide a cementitious building material to entrap air for insulating purposes; and (k) to provide a cementitious material that has the ability to absorb contaminated liquids.

A further advantage is to provide a building material that is well suited in the application of poured floors. Insulation qualities indicate 30 to 40 times the resistance of standard concrete (resistance to thermal change). The sawdust mix incorporated with air entrapment produces a floor that is user friendly in applying. The new composition is hard wearing and well insulated against the intrusion of dampness. The mix also insulates against heat or cold.

None of the prior art specifically developed a mix for the use in floors. The present invention produces a more yielding and softer surface than standard concrete. Floors are much quieter than standard poured concrete floors. The properties that give the invention such good thermal insulation qualities, also produce an acoustical softening effect. The high insulating qualities also softens the sharp echoes and reverberations normally associated with a concrete floor. Floors produced with the present invention are far less costly and safer than wood floors. Because of the lighter weight, pouring and screeding can be accomplished with smaller crews. This again produces a savings in the installation of the product. A power screed, used in the pouring process of a floor works extremely well with the invention. Applications are used for residential, agricultural and light commercial purposes including gymnasium floors.

Another advantage is to provide a building panel that does not sweat like concrete or concrete blocks. A building constructed with such panels need only to be sealed inside and out to preserve its insulating qualities. The material can be used as an easily pumped and easily applied stucco material to hide the seams and joints of the panels. This creates an attractive low-cost building. Unlike most prior art, siding or paneling can be attached to the panels with standard wood-fastening devices. Doors and windows can be directly secured to the panels thus saving substantially the use of framing lumber. The windows and doors so secured give a much tighter and better fit.

The mixture is easy to produce. The present invention requires no hammer mills, no heating or boiling or extended curing times or storing in vats. The air bubbles are produced with an air compressor and is less costly and less offensive than the odor of ammonia given off when using ammonium sterate. The air bubbles preclude the need for mechanical and electrical vibrators. Mechanical and electrical vibrators are not usable under certain conditions such as with explosive contaminants.

DETAILED DESCRIPTION

A cementitious composition is provided, and yields a strong, lightweight, waterproof, insulating concrete when cured. The composition consists of 6 gallons of sawdust, 1 gallon of bentonite, 1 gallon of diatomite, 1 gallon of calcium oxide, 1 quart of sodium chloride, 1 gallon of Portland cement, and 3 gallons of water.

The sawdust need not be excessively dry. Sawdust, in its natural form is very absorbent and is used without heating. Pine, larch and various types of sawdust have been used. Some prior art have stipulated hardwoods such as oak and hickory, however, good results have been obtained by larch and pine. Panels containing sawdust, in the accordance with the present invention, have good compressive and structural strength. Panels so constructed also have excellent thermal and acoustical insulating qualities.

To achieve a high degree of impermeability, bentonite has been used. Bentonite is well known as a water swellable, colloidal clay.

Diatomite, when added to Portland cement, offers a remarkable improvement in plasticity and general workability. The Pierce Testing Laboratories of Denver, Colo., found that a 3% addition of diatomite (based on cement weight) increased compressive strengths at 28 days by 29% while increasing impermeability by as much as 220%. When diatomite is used, the cement has a smoother, uniform texture and better pumpability.

Calcium oxide contributes to the plasticity of the mix. It is also useful in creating a very tenacious adhering power which helps the mix hold to forms and molds. It also helps adhere to walls in a stucco application.

Sodium chloride helps the slaking effect of the calcium oxide and improves the mixability of the components. Sodium chloride also hastens the set-up time and increases the absorption level of the mix.

A good quality type I/II Portland cement can be used. Either the grey or the white cement can be utilized.

Products produced with the invention can be made with various dyes and pigments if a colored product is desired. The product can be either painted or treated with polyurethane.

Water should be clean, and, for best results, be used between a 50 to 80 degree temperature range.

By creating "bubbles" in the cement using an air compressor, the density is lowered and the entrapped air bubbles causes the mixture to have a greater insulation value. Adding the air bubbles allows the homogenous blending of all of the ingredients.

The dry ingredients are put in the mixer in the order listed above. The ingredients are allowed to rotate and mix in the mixing device. When the water is added, the timing is started and the mix is rotated for four minutes. After the four minutes, the drum is stopped from rotating and the air bubbles are introduced to the mass. Air pressure of 40 to 60 pounds is induced into the mass by way of the air hose connected to an air compressor. The mixture is then pumped or poured into the panels or forms whichever is being used. The air bubbles are then put into the form. By using air bubbles, the mix takes the exact shape of the form and eliminates the honeycomb effect which would occur without the air bubbles. Even in pouring a floor or slab, the air bubbles are kept in the mix. This allows the homogenous blending of all the ingredients.

It is imperative that sufficient water be added to the mix to provide a suitable texture for pumping or pouring into forms or molds. Unlike prior art, no pressure is required on the material in the mold. Also, vibration is not needed as the air bubbles replace the need for vibratory plates. The forms or molds can then be released and the finished panels can be allowed to cure. It takes 30 days for the mixture to cure to full strength under normal conditions. In the use of the material in prepoured walls, the forms can be removed after 36 hours under normal conditions. In the use of the material in pouring floors, the material should be allowed 36 hours to set up properly.

While the above embodiments of this invention have been described, it is understood that the invention is capable of other functions. Also, it should be understood that the lightweight, insulating, waterproof, cement, and concrete terminology described herein is intended to be generic and should not be regarded as limiting.

The new composition described herein provides the following benefits: 1) a lightweight cementitious composition approximately one third the weight of standard concrete; 2) entrapped air gives the composition an insulating property approximately 30 to 40 times more thermal resistant than standard concrete; 3) is capable of being worked with standard carpentry tools; 4) is fire resistant; 5) resistant to insects; 6) is easy to clean; 7) can be readily agitated by compressed air to help vibrate and homogenize the mass. It is envisioned that the composition be used in poured floors, wall panels, roof panels, and other building products. The composition, in the slurry form, has the unique ability to absorb contaminated liquids.

SUMMARY OF THE INVENTION

While the above and other improvements represent advances in insulating qualities of concrete, and, in spite of various improvements in concrete building materials, whether they contain or do not contain any of the components described above, there was much need for improvement. Prior art, panels, and building materials produced are far costlier to manufacture and lack the super absorption qualities and superior thermal, acoustical insulating qualities of the present invention. Accordingly, it is an object of the present invention to provide a new composition that overcomes the deficiencies of prior art.

My present invention particularly relates to novel compositions for the preparations of concrete building materials and to building panels prepared from such compositions. It has been found that the addition of the sodium chloride, calcium oxide and the use of 40 to 60 pounds of compressed air in the mixing process, produces a building material with superior properties. The properties that are improved are the reduction of mixing time, and a more homogenous material. The material sets up faster and has vastly improved thermal and acoustical insulating qualities. The material also has 30 to 40 times the insulating properties of standard concrete. The material is one third the weight of regular concrete. The material is fire resistant, easy to clean, and is resistant to insects and mold.

In a preferred embodiment of the invention, which the applicant calls Z MIX, some of the sawdust is replaced with cinders or sand. This is to increase the hardness and wearability of the material. This is particularly helpful when the material is to be used for roofing or for exterior stucco.

The invention further relates to novel absorption qualities which are applicable to unique absorption containment functions. The present invention, while in the slurry state, has the ability to imbibe contaminants, especially when the compressed air bubbles agitate the mass. The contaminated liquid is assimilated into the mass.

The aqueous mixture previously described is ideal for filling tanks and cylinders to absorb and contain hazardous liquid contaminants. The cementitious mass produced absorbs and encapsulates the contaminants. During the filling process, a steady stream of air bubbles is introduced to the mass by way of an air compressor hose. The compressor is run between 40 to 60 pounds of pressure and air is introduced into the mass during the entire filling procedure. The air is allowed to continue to mix until the tank or cylinder shows signs of a homogenous blending of the contaminants and the components of the mixture.

A unique and novel performance of the present invention is that once the mass cures or hardens, the bentonite forms its well documented water-shielding properties preventing the leaching out of the contaminants. This provides a unique and novel method of cleaning up contaminated cylinders or underground tanks, and is heretofore not been used in this manner by prior art.

What is claimed as invention is:

1. A method for forming a lightweight, waterproof building product which includes:

forming a dry mix from a plurality of dry mix components including bentonite, diatomite, calcium oxide, Portland cement and a sawdust containing lightweight filler material by mixing equal volumes of bentonite, diatomite, calcium oxide and Portland cement and a volume of sodium chloride which is half that of the other dry mix components with sawdust containing filler, the volume of said filler being greater than the combined volumes of the other dry mix components, adding water to the dry mix and mixing the resultant mass, terminating the mixing of the resultant mass and then adding compressed air to the mass to create air bubbles therein, and terminating the addition of compressed air to the mass, pouring the mass into a containment form, adding compressed air to the mass in the containment form, terminating the addition of compressed air to the mass in the containment form and allowing the mass to cure.

2. The method of claim 1 wherein said filler is formed entirely of sawdust.

3. The method of claim 1 wherein said filler is formed of a sawdust and aggregate mixture.

4. The method of claim 3 wherein said aggregate constitutes at least one third of the aggregate-sawdust mixture.

5. The method of claim 4 wherein said aggregate is fly ash.

6. A method for absorbing and containing liquid contaminants within a vessel which includes:

forming a dry mix from a plurality of dry mix components including bentonite, diatomite, Portland cement and sawdust by mixing volumes of bentonite, diatomite and Portland cement with a volume of sawdust which is greater than the combined volumes of the other dry mix components, adding water to the dry mix and mixing the resultant mass to form a slurry, introducing the slurry into the vessel containing the liquid contaminants, introducing compressed air into the slurry within the vessel to create air bubbles therein and to blend the liquid contaminants and the slurry, and terminating the introduction of compressed air and allowing the slurry to cure within the vessel.

7. The method of claim 6 wherein the mixing is terminated and compressed air is added to the slurry before the slurry is introduced into the vessel.

8. The method of claim 7 wherein equal volumes of bentonite, diatomite, and Portland cement are included in said dry mix.

9. The method of claim 8 wherein a volume of calcium oxide equal to the volume of Portland cement is included in said dry mix and a volume of sodium chloride equal to one half the volume of Portland cement is included in said dry mix.

10. The method of claim 8 wherein said compressed air is added under a pressure within a range of from 40 to 60 pounds.

* * * * *